United States Patent
Ji (10) Patent No.: US 6,830,064 B2
(45) Date of Patent: Dec. 14, 2004

(54) LEAK CONTROL VALVE

(76) Inventor: Chang-Hyeon Ji, #103-506 Ha-an Hyundai Apartment, 707-9 Ha-an 1-dong, 423-061 Kwang-Myung City (KR)

( * ) Notice: Subject to any disclaimer, the term of this patent is extended or adjusted under 35 U.S.C. 154(b) by 56 days.

(21) Appl. No.: 10/220,058

(22) PCT Filed: Dec. 13, 2001

(86) PCT No.: PCT/KR01/02155

§ 371 (c)(1),
(2), (4) Date: Aug. 28, 2002

(87) PCT Pub. No.: WO02/053957

PCT Pub. Date: Jul. 11, 2002

(65) Prior Publication Data

US 2003/0037821 A1 Feb. 27, 2003

(30) Foreign Application Priority Data

Dec. 29, 2000 (KR) .................................... 2000-0085031
May 4, 2001 (KR) .................................... 2001-0024237
Oct. 12, 2001 (KR) .................................... 2001-0063020

(51) Int. Cl.$^7$ .............................................. F16K 15/00
(52) U.S. Cl. ................. 137/517; 137/513.7; 137/515.5; 137/529; 137/541
(58) Field of Search .......................... 137/513.3, 513.7, 137/515, 515.5, 517, 529, 541, 543.17

(56) References Cited

U.S. PATENT DOCUMENTS

| | | | | |
|---|---|---|---|---|
| 701,754 A | * | 6/1902 | Moran | 137/509 |
| 2,541,282 A | * | 2/1951 | Powers | 137/204 |
| 2,929,399 A | * | 3/1960 | Magowan, Jr. | 137/513.7 |
| 3,403,697 A | * | 10/1968 | Fenton | 137/517 |
| 3,561,471 A | * | 2/1971 | Sands | 137/498 |
| 3,756,270 A | * | 9/1973 | Fonseca et al. | 137/480 |
| 3,850,195 A | * | 11/1974 | Olsson | 137/503 |
| 4,172,470 A | | 10/1979 | Walker | |
| 4,190,075 A | | 2/1980 | Kayser | |
| 4,562,861 A | | 1/1986 | Payton | |
| 4,706,705 A | | 11/1987 | Lee, II | |
| 4,811,756 A | * | 3/1989 | Hall | 137/498 |
| 6,513,545 B2 | * | 2/2003 | Rhone et al. | 137/529 |

OTHER PUBLICATIONS

PCT International Search Report from Korean Intellectual Office dated Mar. 28, 2002.

* cited by examiner

*Primary Examiner*—Ramesh Krishnamurthy (57) ABSTRACT

A leak control valve preventing the damage of the vacuum pump and/or the neighboring instruments even in the case of fluid leak at the vessel.

The side wall of the valve poppet closes the channel to the outlet through restoring forces of the springs installed at both sides of the poppet in case when the abrupt pressure change happens by accident.

2 Claims, 9 Drawing Sheets

LEAK CONTROL VALVE

CROSS REFERENCE TO RELATED APPLICATIONS

This application corresponds to International Patent Application No. PCT/KR01/02155, filed Dec. 13, 2001, and claims priority under 35 U.S.C. §119 from Korean Patent Application No. 2000-0085031, filed Dec. 29, 2000; Korean Patent Application No. 2001-0024237, filed May 4, 2001; Korean Patent Application No. 2001-0063020, filed Oct. 12, 2001.

FIELD OF THE INVENTION

The present invention relates to a leak control valve, and more particularly to a check valve for protecting the vacuum chamber and neighboring instruments in case of the abrupt vacuum leakage by accident.

DESCRIPTION OF THE RELATED ART

Recently, a check valve has been used for protecting the vacuum chamber, for instance, in the manufacturing lines of semiconductors and plasma display panels.

Since the conventional check valve, however, shuts off the leak in a unidirectional manner, it is technically difficult to apply the conventional check valve to the vacuum control system between a vacuum pump and a vacuum tube.

Figure 1:
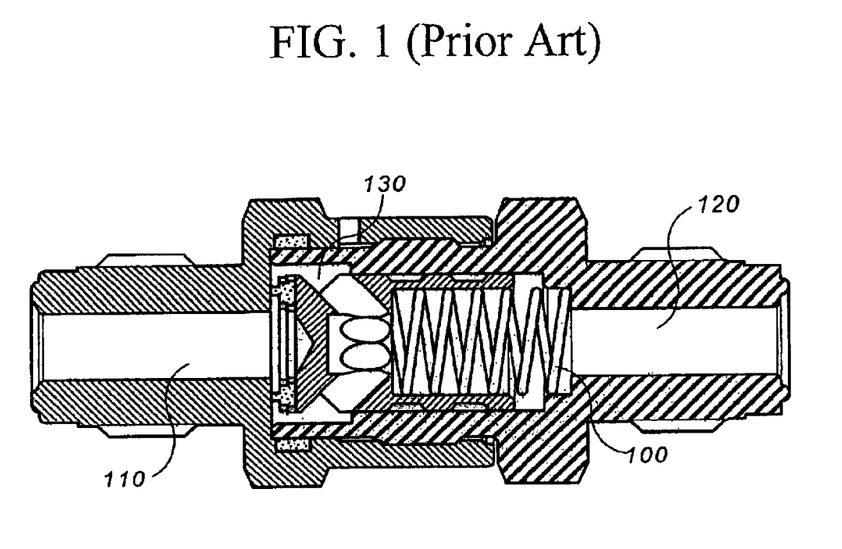
FIG. 1 shows a cross-sectional view of a traditional check valve.

In FIG. 1 is shown a cross-sectional view of a traditional check valve. Referring to FIG. 1, the internal spring 100 exerts a restoring force against the flow through the inlet 110 so that the inlet 110 is closed.

Now, it may happen by accident that an abnormally high pressure is formed at the inlet 110. If the pressure at the inlet 110 is higher than the resisting force of the spring 100, the control valve is opened and the flow of high pressure is by-passed through the pathway 130.

As another approach in accordance with the prior art, an automatic control valve can be employed. However, the automatic control valve has an inherent problem in a sense that the response time of the automatic control valve is relatively slower than the propagation time of the pressure flow from the inlet to the outlet.

In other words, the prior art needs an instrument that senses the leak of flow and sends a control signal to the valve. However, the shortcomings of the prior art is that since the response time of the vacuum sensor or the leak detector is generally slow, the automatic control valve does not respond to the diffusion speed of the pressure flow.

Therefore, the vacuum control valve of the prior art can not promptly respond to the sudden leak of the flow by accident.

Figure 2:
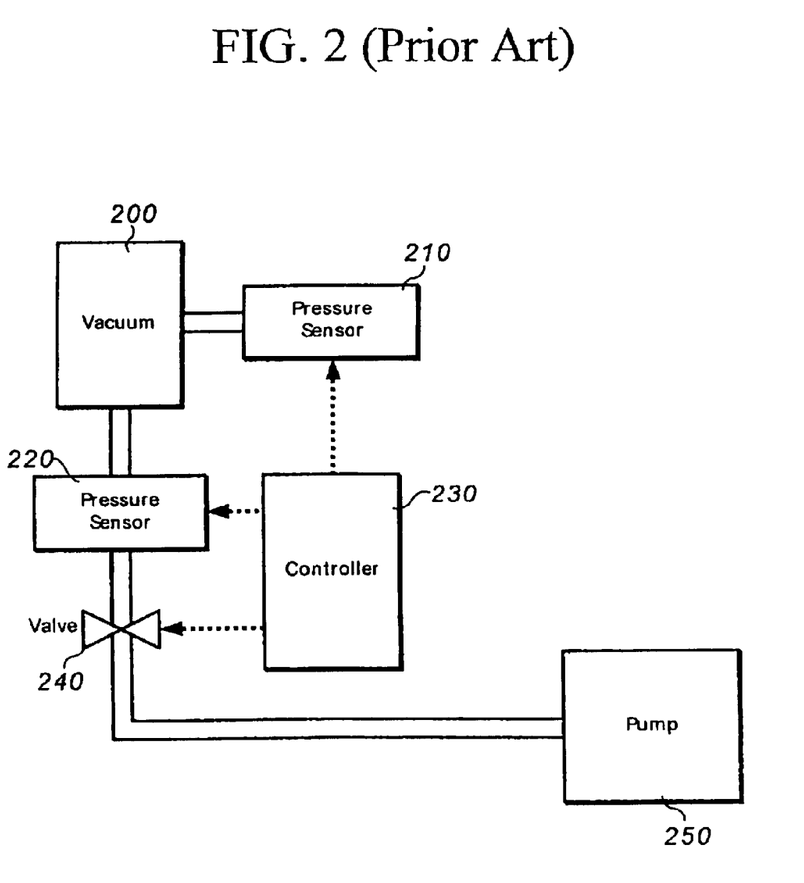
FIG. 2 is a schematic diagram illustrating the vacuum control valve in accordance with the prior art.

FIG. 2 is a schematic diagram illustrating the vacuum control valve in accordance with the prior art Referring to FIG. 2, pressure sensors 210 and 220 detect any leakage and report the leak to the controller 230 in case when the leak, for instance, due to breakage of the vacuum tube 200 happens by accident.

Then, the controller 230 blocks the vacuum tube 200 from the vacuum pump 250 through closing the vacuum valve 240. In this case, the fact is that the propagation speed of electrical signal of the pressure sensors 210 and 220, as well as the controller 230 is relatively faster than the propagation speed of the pressure from the vacuum tube.

However, the vacuum valve 240 of the prior art has shortcomings because the sensing speed of the instruments like the pressure sensor 210 and 220 is slower than the propagation speed of the pressure.

Figure 3:
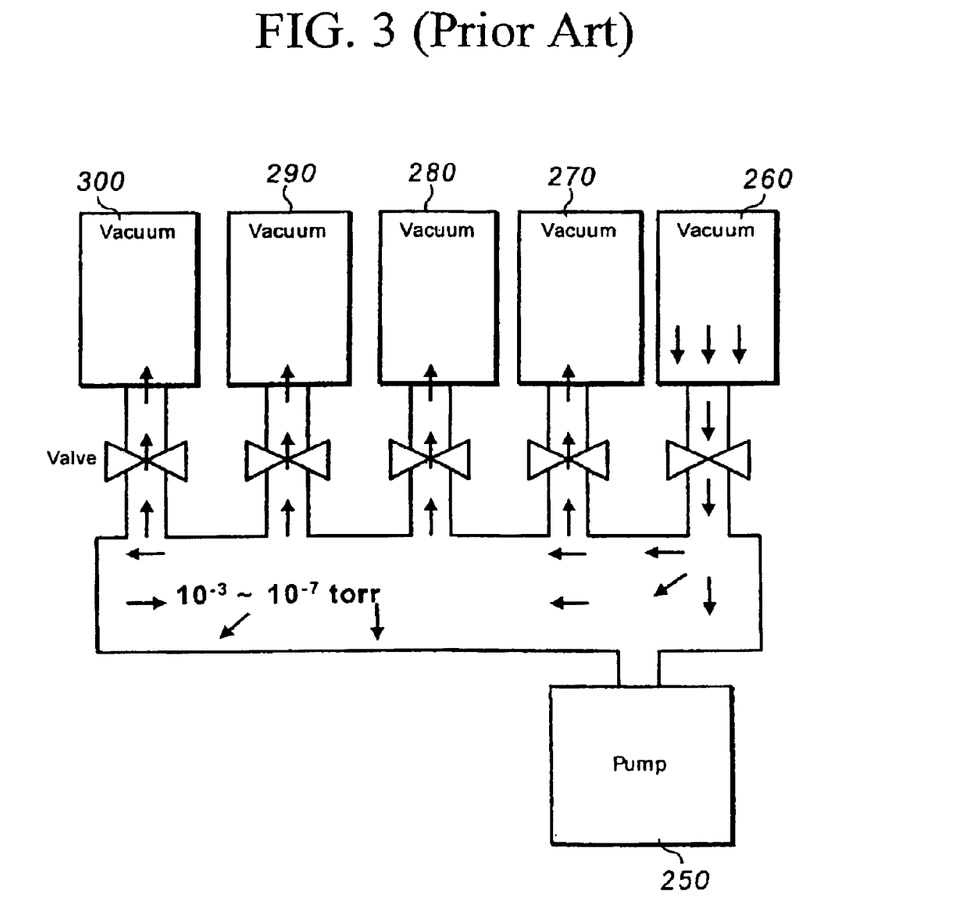
FIG. 3 shows a conventional arrangement of vacuum tubes in a production line.

Furthermore, in case when one of the vacuum tubes 260 in production lines such as in semiconductor manufacturing industry or in plasma display panel (PDP) manufacturing lines is broken, the adjacent vacuum tubes 270, 280, 290 and 300 are simultaneously damaged due to the leak from the broken tube 260.

SUMMARY OF THE INVENTION

In view of these problems, there is a need in the art for a vacuum control valve effectively and promptly blocking the propagation of flow due to pressure difference in case of the accidental leak between the vacuum tube and the vacuum pump.

Accordingly, it is an object of the present invention to provide a vacuum control value that can promptly block the propagation of the pressure flow in case when the leak occurs between the vacuum tube and the vacuum pump by accident.

It is further an object of the present invention to provide a vacuum control valve that can protect the adjacent instruments such as the other vacuum tubes or the sensors when abrupt alteration of pressure is caused by the accidental leak between the vacuum tube and the vacuum pump.

Yet it is another object of the present invention to provide a vacuum control valve that prevents the breakage of the vacuum tubes due to the reverse flow in case when the vacuum pump malfunctions by accident.

BRIEF DESCRIPTION OF THE DRAWINGS

Further features of the present invention will become apparent from a description of a vacuum control valve, taken in conjunction with the accompanying drawings of the preferred embodiment of the invention, which, however, should not be taken to be limitative to the invention, but are for explanation and understanding only.

In the drawings.

BEST MODE FOR CARRYING OUT THE INVENTION

The present invention will be explained in detail with reference to the accompanying drawings.

Figure 4:
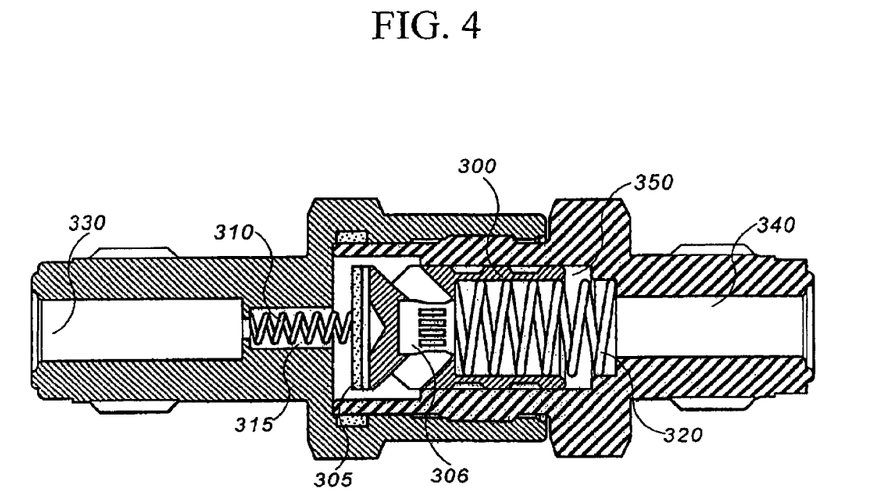
FIG. 4 is a schematic diagram illustrating the cross-section of a leak control valve in accordance with a first embodiment of the present invention.

FIG. 4 is a schematic diagram illustrating the cross-section of a leak control valve in accordance with a first embodiment of the present invention. Referring to FIG. 4, the leak control valve comprises a first spring 310 and a second spring 320 on both sides of the poppet 300.

The leak control valve in accordance with the present invention comprises an outlet 330 connected to the vacuum pump, an inlet 340 connected to the vessel, and a valve chamber 350 housing the valve poppet 300 and passing the flow pumped from the vessel.

In this case, the valve poppet 300 in the valve chamber 350 moves back and forth between a first position to a second position by opposing restoring forces of the first spring 310 and the second spring 320, and the pressure of the flow from the vessel.

In normal operation, the spring constant of a first spring 310 should be high enough to ensure that a first side-wall 305 of a valve poppet 300 does not close the flow channel 315 of the outlet 330 during the evacuating step of the vessel.

As a preferred embodiment in accordance with the present invention, the spring constant of a first spring 310 can be determined in such a manner that the restoring force should be larger than the evacuating force of the vacuum pump.

More preferably, the spring constant of a first spring 310 can be determined in such a way that the outlet 315 is wide open in the presence of the pressure difference between the inlet 340 and outlet 330. As a preferred embodiment for the first side wall 305 of the valve poppet 300, a rubber ring can be employed for better lubrication.

Additionally, a second spring 320 is implemented on a second side-wall 306 of the poppet 300 toward the inlet 340 in order to make the valve poppet 300 floated.

Now, when the leak happens by accident, for instance, due to the breakage of the vacuum tube, the pressure at the inlet 340 becomes rising. Then, the first side wall 305 of the valve poppet 300 promptly closes the channel to the outlet 315 through the immediate shift of the valve poppet 300 due to the pressure difference between the inlet 340 and the outlet 330.

Consequently, it is possible to take a prompt measure to protect the vacuum pump, other instrument, and/or other vacuum tubes at the side of the outlet 330 even if the leak happens at the side of the inlet 340 accidentally.

Figure 5:
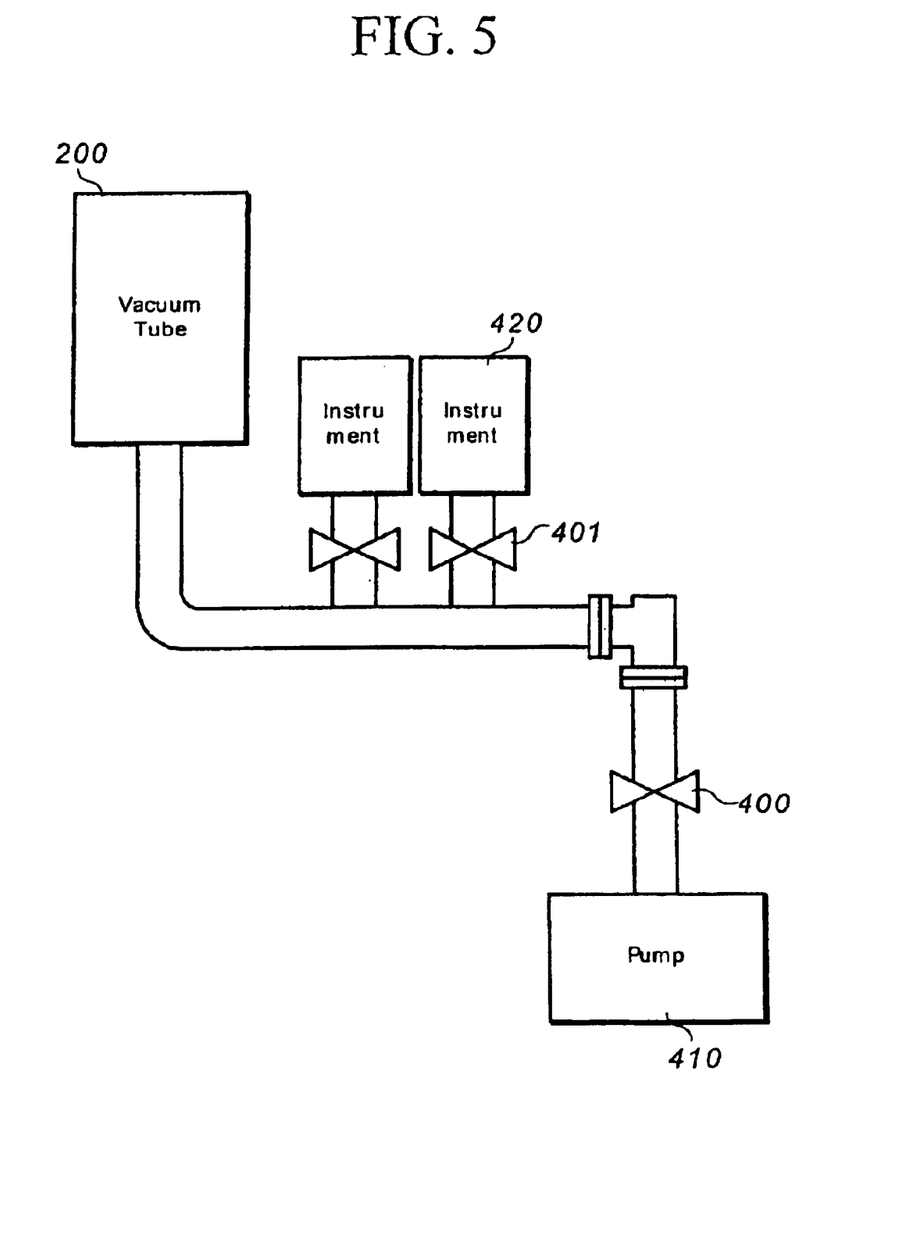
FIG. 5 is a schematic diagram comprising a leak control valve in accordance with the present invention.

FIG. 5 is a schematic block diagram of the vacuum system comprising a leak control valve in accordance with the present invention. Referring to FIG. 5, in the semiconductor manufacturing lines, for instance, leak control valves 400 and 401 are installed at the front of the vacuum pump 410 and the instrument 420, thereby preventing the reverse flow of the pressure even in the case of the malfunction of the vacuum pump.

Figure 6:
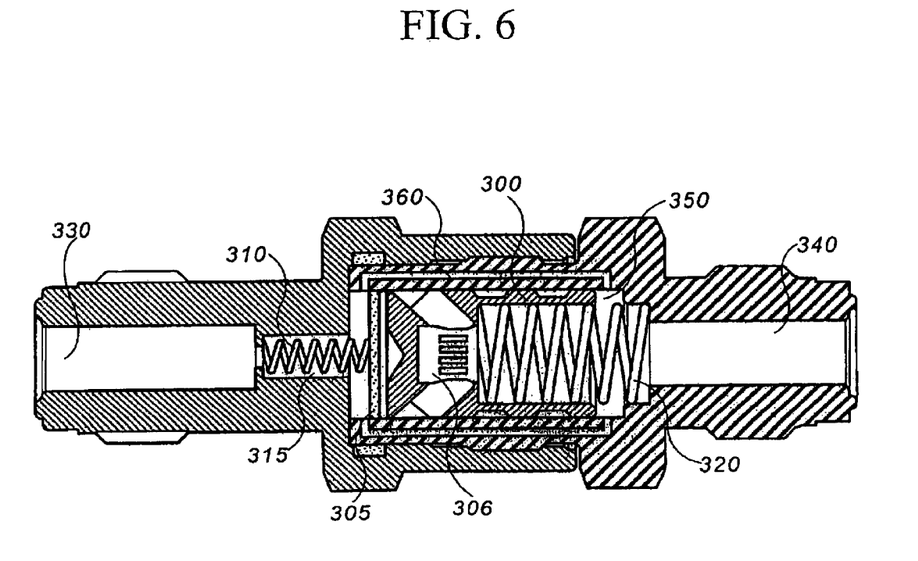
FIG. 6 is a schematic diagram illustrating the cross-section of a leak control valve in accordance with a second embodiment of the present invention

FIG. 6 is a schematic diagram of the cross-section of a leak control valve in accordance with a second embodiment of the present invention.

The second embodiment has a feature in that a first side wall 305 of the valve poppet 300 is in close contact with the inner wall of the valve chamber.

In other words the first embodiment, illustrated in FIG. 4, provides a leak control valve of which the poppet has rooms both at the top and at the bottom. In the meanwhile, the second embodiment has a feature in that the poppet does not have rooms at all and is closely in contact with the walls of the chamber. Instead, the second embodiment lets the fluid flow through a pathway prepared at the side.

Figure 7A:
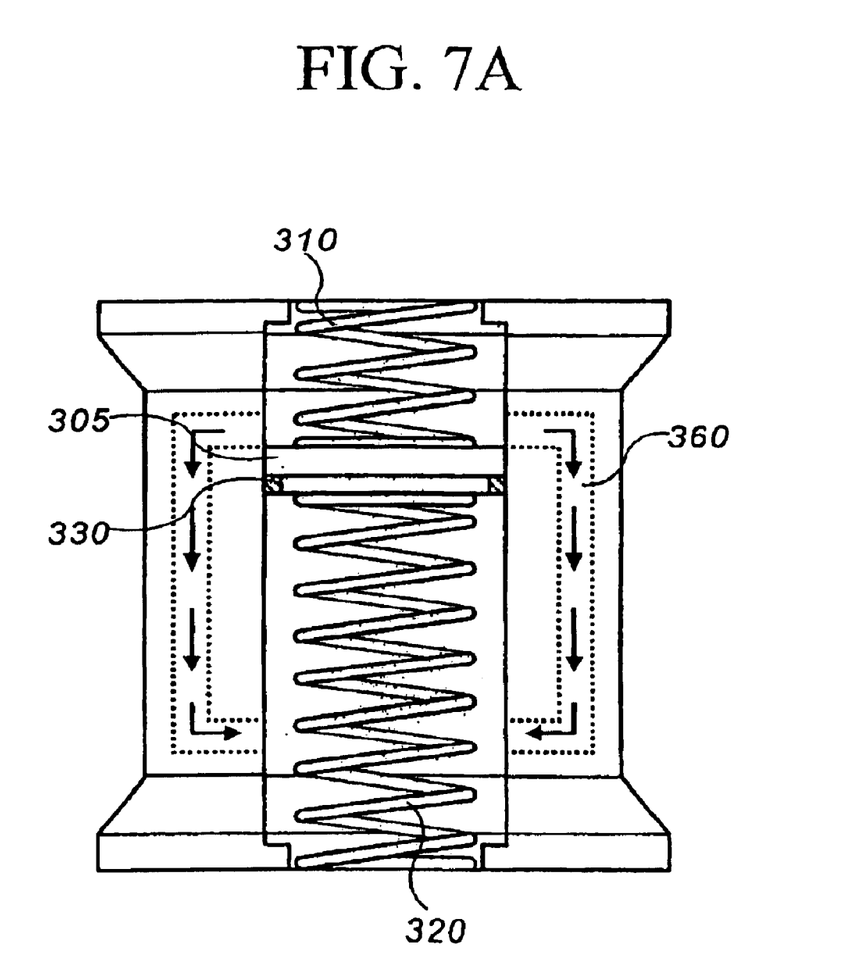
FIG. 7 is a schematic diagram illustrating the detailed structure of a leak control valve in accordance with a second embodiment of the present invention.
Figure 7B:
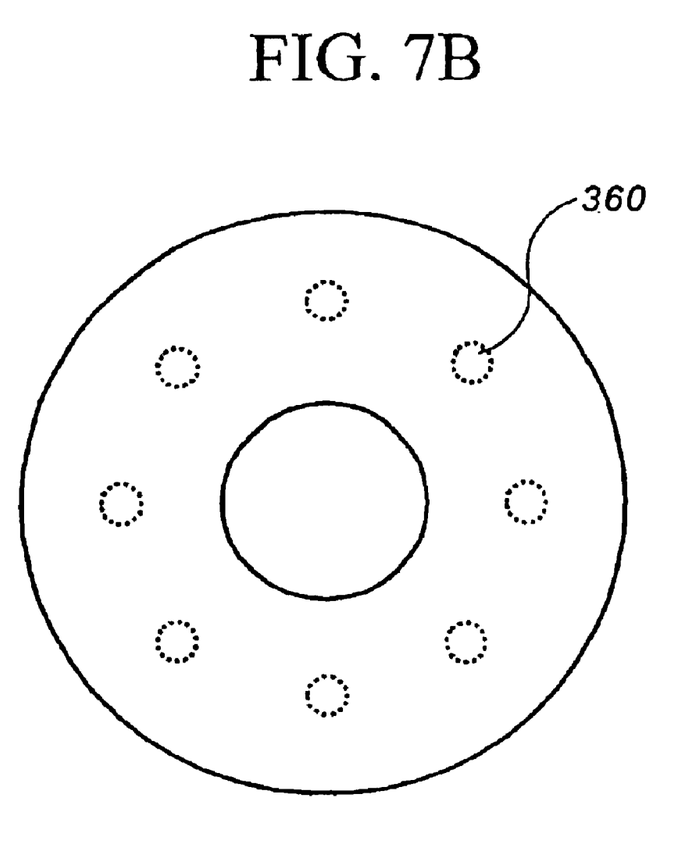

FIGS. 7A and 7B are schematic diagrams illustrating the operational mode of a leak control valve in accordance with a second embodiment of the present invention.

Referring to FIGS. 7A and 7B, a second embodiment comprises a first spring 310, a blocking panel 305, a seal O-ring 330, a second spring 320, and sub-pumping unit 360.

Preferably, the number of sub-pumping units 360 can be chosen in consideration of the amount of pumping flow. In addition, the size of the holes can also be varied in accordance with the purpose of the application. The seal O-ring 330 functions as a support of the blocking panel 305 during the pumping stage, and prevents from any leak of flow.

A second embodiment, as depicted in FIGS. 7A and 7B, has a feature in that the propagation speed of gas flow through the main channel 390 is faster than that through the sub-pumping unit 360. Consequently, the main channel is blocked before the initiation of bypassing the flow through the sub-pumping units 360.

Figure 8:
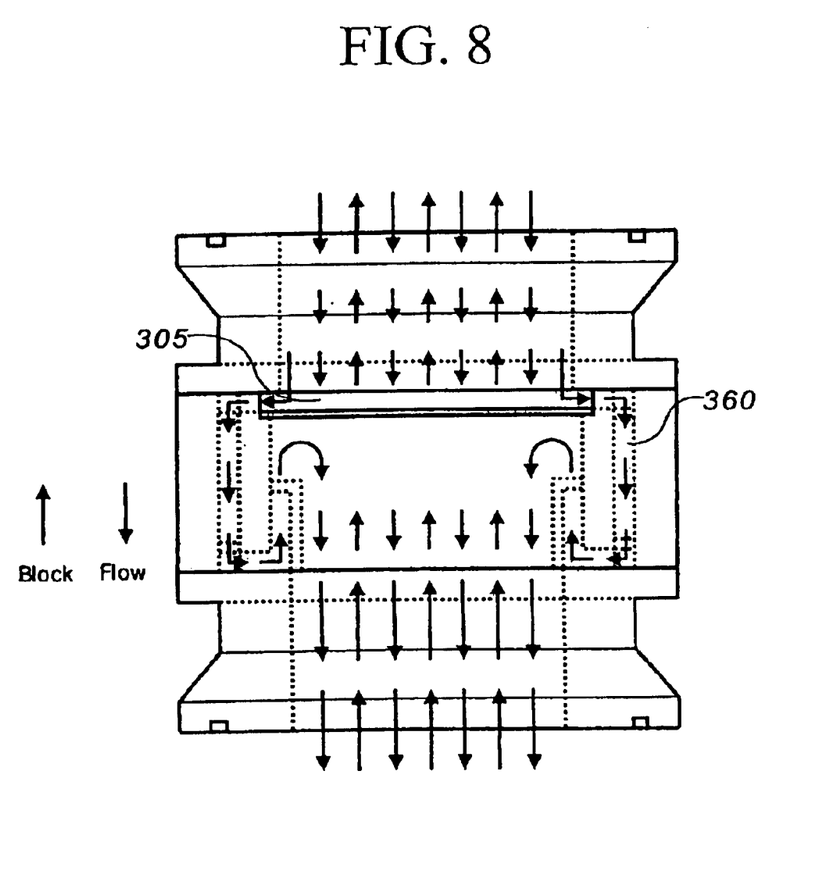
FIG. 8 is a schematic diagram illustrating the cross-section of a leak control valve in accordance with a third embodiment of the present invention.

FIG. 8 is schematic diagram illustrating a third embodiment in accordance with the present invention. Referring to FIG. 8, a third embodiment has a feature in that the by-path of the sub-pumping unit 306 has a U-shape.

Generally speaking, the gas pressure coming to the valve rises relatively slowly.

Therefore, it takes a little bit of time to have a gas pressure high enough to move the blocking panel 305 backward.

Consequently, the by-path of the sub-pumping unit 360 is intentionally lengthened in an effort to speed up the storage time for gas pressure. As a preferred embodiment of the present invention, the sub-pumping unit 360 can be implemented by a multiple of conductance tubes, and the length of the detoured passage can be varied in consideration of the amount of incoming gas flow.

Although the invention has been illustrated and described with respect to exemplary embodiments thereof, it should be understood by those skilled in the art that various other changes, omissions and additions may be made therein and thereto, without departing from the spirit and scope of the present invention.

Therefore, the present invention should not be understood as limited to the specific embodiment set forth above but to include all possible embodiments which can be embodies within a scope encompassed and equivalents thereof with respect to the feature set forth in the appended claims.

What is claimed is:

1. A leak control valve, comprising:
   a valve chamber through which a fluid flows from an inlet connected to a vessel, and to an outlet connected to a vacuum pump;
   a blocking panel that moves in a floated manner between a first position and a second position, and further moves back and forth in response to a pressure difference between the fluid flow from the inlet and pumping power of the vacuum pump;
   a seal O-ring functioning as a support of the blocking panel installed at the side wall of said blocking panel, and as a seal for blocking a leak;
   a sub-pumping unit, implemented in an inner wall of said valve chamber for bypassing said fluid flow from the inlet to the outlet;
   a first spring having a first end connected to a first side wall of said blocking panel and a second end connected to the outlet, exerting a restoring force at the blocking panel toward the direction to the inlet such that a channel to the outlet is open during a normal operation of vacuum pumping, while the channel to the outlet is closed by the side wall of said blocking panel when the pressure at the side of the inlet becomes high enough to overcome the restoring power due to the leak; and a second spring having a first end connected to a second side wall of said blocking panel and a second end connected to the inlet, exerting a restoring force at the blocking panel toward the direction to the outlet such that the channel to the outlet is open during the normal operation of vacuum pumping and said blocking panel moves back and forth between a first position and a second position in a floated manner, wherein said sub-pumping unit comprises a plurality of conductance tubes and has a U-shape for promoting storage of pressure for a rapid operation of the blocking panel.

2. A leak control valve, comprising:

a valve chamber through which a fluid flows from an inlet connected to a vessel, and to an outlet connected to a vacuum pump;

a valve poppet that moves in a floated manner between a first position and a second position, and further moves back and forth in response to a pressure difference between the fluid flow from the inlet and pumping power of the vacuum pump;

a first spring having one end connected to a first side wall of said valve poppet and a second end connected to the outlet, exerting a restoring force at the valve poppet toward the direction to the inlet such that a channel to the outlet is open during a normal operation of vacuum pumping, while the channel to the outlet is closed by the first side wall of said valve poppet when the pressure at the side of the inlet becomes high enough to overcome the restoring power due to a leak;

a second spring having a first end connected to a second side wall of said valve poppet and a second end connected to the inlet, exerting a restoring force at the valve poppet toward the direction to the outlet such that the channel to the outlet is open during the normal operation of vacuum pumping and said valve poppet moves back and forth between a first position and a second position in a floated manner and a sub-pumping unit, implemented in an inner wall of said valve chamber for bypassing said fluid flow from the inlet to the outlet, wherein said sub-pumping unit comprises a plurality of conductance tubes and has a U-shape for promoting storage of pressure for a rapid operation of the valve-poppet.

* * * * *